Aug. 9, 1938.　　　　E. B. BEASLEY　　　　2,125,878
NUT LOCK
Filed April 28, 1937
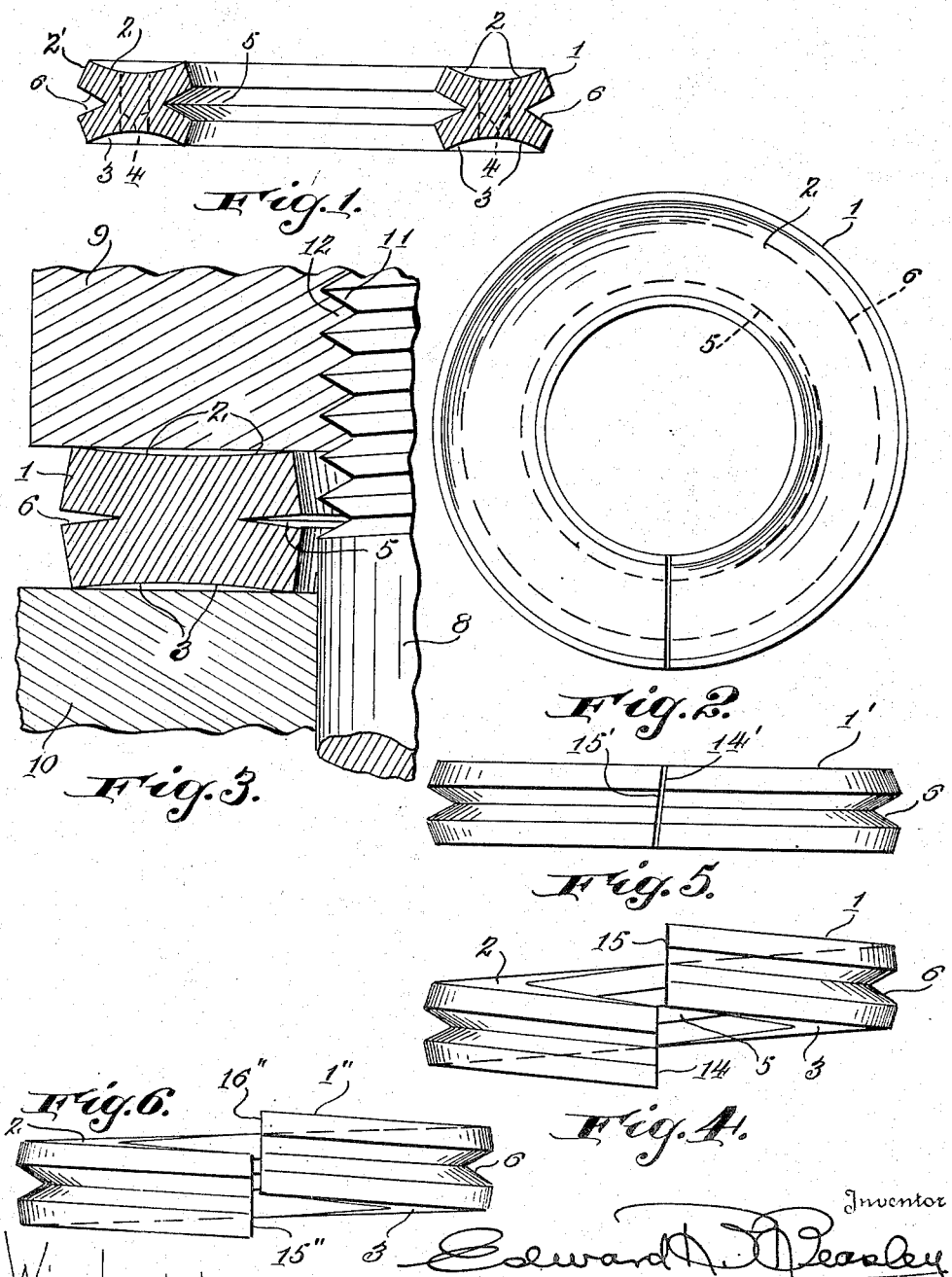

Patented Aug. 9, 1938

2,125,878

UNITED STATES PATENT OFFICE 2,125,878

NUT LOCK

Edward B. Beasley, Ruxton, Md., assignor of one-fourth to Clyde E. Hutzel, Baltimore, Md.

Application April 28, 1937, Serial No. 139,534

3 Claims. (Cl. 151—36)

In the nut locks of the prior art which are of the washer type to be compressed between the nut and the underlying members secured thereby, the resistance presented to the release of the nut by unscrewing is mainly due to the indentation of the nut or the underlying member secured by the nut, such indentation being performed either by the off-set ends of a split washer or other projecting edges. The locking of the nut by indentation in this way is predicated on the supposition that the surfaces of the nut and the underlying members secured thereby are relatively soft and subject to indentation in a manner which provides for permanent locking of the nut.

The type of nut lock which is dependent on the indentation of the parts by the off-set ends of a split washer has the objection that, when the nut is tightened, the ends of the ring or washer are flattened into the plane of the bottom surface of the nut, so that there is comparatively little locking effect due to indentation of the surfaces by the off-set ends, the locking effect being mainly due to the tension resulting from the off-set. This is relatively slight as too much off-set causes the ring or washer to break when flattened, and also has a tendency to cause the rings to link together when kept in bulk.

The type of washer having peripherally arranged cutting or indenting edges as hithertofore constructed is not well adapted to production by rolling and is therefore expensive to manufacture. Further, the locking tension which it applies to the nut is mainly due to the off-set at the ends. The indenting effect of the peripheral edges has a comparatively slight tendency to prevent unscrewing, so that a slight loosening of the nut from any cause, as strain or vibration, releases the lock and permits it to be unscrewed.

The present invention provides a nut lock of the washer or ring type which is adapted to production at high speed and therefore in large quantities at relatively small cost and which, to a large degree, overcomes the difficulties of the prior art. This nut-locking washer or ring may be defined as formed, as to its radial cross section, in two oppositely disposed arches having the keystones juxtaposed or in common, the inner and outer edges being peripherally grooved to provide for flattening of the arches by closing these grooves under the extreme tension incident to tightening the nut.

The compression of the washer or ring incident to the flattening of the arches provides by its reaction a high degree of tension through a comparatively extended distance in the direction of the axis of the nut and bolt, whereby the locking effect on the nut is applied for a correspondingly extended distance as the nut is tightened and maintained for a similar distance as it is unscrewed; also the tension is considerable as compared to that obtained by the mere deflection of the off-set ends and is applied uniformly about the entire circumference of the ring or washer, both to the nuts and the member placed under pressure by the nut and at both the inner and outer peripheries of the washer, giving it a very effective lock which is not subject to release by vibration and repeated stress. This washer or ring may be made either in the form of a flat ring or with the ends off-set, the production of the washer in the form of a split ring being a matter of convenience in manufacture.

In the accompanying drawing, I have illustrated a nut-locking ring or washer embodying the features of the invention in the preferred form.

In the drawing:

Figure 1 is a cross section on a plane of the axis.

Figure 2 is a plan.

Figure 3 is a fragmentary section on a plane of the axis as in Figure 1, showing the washer in locking position, in connection with a nut and bolt.

Figure 4 is an elevation of the washer showing the ends off-set as cut from the coil.

Figure 5 is an elevation similar to Figure 4, showing the washer in the form of a flat ring to prevent linking.

Figure 6 shows the ends off-set to a less degree than in Figure 4, but still adapted to prevent linking.

Referring to the drawing by numerals, each of which is used to indicate the same or similar parts on the different figures, the construction shown comprises a nut-locking ring or washer of the compression type adapted to be produced by rolling at red heat, forming a bar of the desired cross section, then wrapping the formed bar helically about a mandrel, the helix being preferably of extremely short pitch, and cutting into rings which may be tempered as cut or partially or wholly flattened before tempering to reduce the off-set at the ends to avoid linking.

In the drawing, the locking ring or washer indicated by reference character 1 is of a radial cross section, as indicated in Figure 1, which may be defined as consisting of oppositely disposed relatively flat arches 2 and 3, the keystone portions of the arches enclosed in dotted lines at 4 being best defined either as integral and substantially identical or juxtaposed. In order to complete the formation of the arches and provide for flattening of the same, the inner and outer edges of the ring are grooved peripherally at 5 and 6, the arches 2 and 3 and the peripheral grooves 5 and 6 being continued about the entire circumference of the ring. This ring, as already pointed out, is preferably formed by the rolling to the cross section shown at both sides in Figure 1 of a relatively straight bar of spring steel which is thus formed at red heat, being while still red wound in a helix preferably of very short pitch and cut into rings as illustrated in Figure 4.

Figure 3 shows fragmentarily a section on the plane of the axis of a bolt 8, a nut 9, and another member secured thereby indicated by reference character 10, the nut being turned down under considerable tension so that the locking ring 1 and particularly the arches 2 and 3 thereof are substantially flattened as shown in this figure, the inner and outer peripheral grooves 5 and 6 being substantially closed. Under these circumstances, a considerable degree of tension is applied to the bolt 8, the nut 9, and member 10, pressing the threads 11 and 12 thereof into close contact under extreme tension, the distance over which the tension is applied being represented by the difference between the openings at grooves 5 and 6 in Figures 1 and 3.

Under these circumstances, it will be apparent that tension being applied for a considerable distance in the direction of the axis and about the center periphery, the unscrewing of the nut is resisted for a number of turns corresponding to this distance, giving a very effective lock which is not released by vibration and repeated stresses applied to the nut and bolt.

Figure 4 shows the ends 14 and 15 of the lock washer off-set in the manner which will result from cutting the rings from a flat helix, the pitch of which is equal to the thickness of the ring in the direction of the axis. The ring thus formed is, it will be understood, flattened in locking position, bringing the ends 14 and 15 into alinement, also being flattened as to the cross section as illustrated in Figure 3. This combines the tension due to flattening the off-set with that due to flattening the arches.

The thickness of the walls of each arch outside the keystone should be uniform, or the legs of the arches may be of slightly reduced thickness toward the ends 2' remote from the keystone.

Figure 5 shows a locking washer or ring 1' flattened after cutting from the helix and before tempering, to bring the ends 14' and 15' into alinement, or closing the ring, as it may be termed. This form has the advantage that it cannot link when the washers are packed in bulk and the effect can be produced by less complete flattening.

Figure 6 shows a locking ring or washer 1" having off-set ends 15" and 16" being partially flattened by pressure when still hot to cause the ends 15" and 16" to overlap for about one half their thickness. This arrangement has the advantage that it prevents linking and also avoids the chance that the ring or washer may break in flattening the off-set locking; i. e., in applying pressure by tightening the nut.

The manner of rolling and cutting such a locking washer or ring having been described, it will be appreciated that this product, which is of high efficiency as a locking ring, can be produced in large quantities at high speed, automatically if desired, making a cheap and satisfactory product of high efficiency in the use to which it is intended to be applied. As pointed out in the preamble and in the description of the operation, the double arch construction, applying uniform tension throughout the inner and outer peripheries of the washer or ring with the tension applied for a relatively long distance in the direction of the axis as the nut is tightened and correspondingly maintained as it is unscrewed, is of great importance.

I have thus described specifically and in detail a locking ring or washer embodying the features of my invention in the preferred form in order that the manner of constructing, applying, operating, and using the invention may be fully understood; however, the specific terms herein are used descriptively rather than in limiting sense, the scope of the invention being in the claims.

What I claim as new and desire to secure by Letters Patent, is:

1. A nut lock in the form of a ring of resilient metal, the radial cross section of the ring being in the form of two oppositely disposed arches having their keystones integral and substantially identical, and the inner and outer peripheral edges of the ring being grooved substantially in the form of a V about the entire inner and outer peripheral length of the ring to complete the arches, the arches being flattened and the said grooves being closed when the nut is tightened, providing locking tension due to the reaction of the ring when thus deflected, the walls of each arch being of substantially uniform thickness beyond the keystone.

2. A nut lock in the form of a ring of resilient metal, the ring being split in a substantially radial plane, providing abutting ends, the ends being off-set by less than half the thickness of the ring in the direction of the axis, thus avoiding the tendency to link and also avoiding the tendency to break the ring by excess deflection when it is flattened in locking, the radial cross section of the ring being in the form of two oppositely-disposed arches having their keystones integral and substantially identical and the inner and outer peripheral edges of the ring being V grooved around the entire periphery of the ring to complete the arches.

3. A nut lock in the form of a ring of resilient metal, the radial cross section of the ring being in the form of two oppositely disposed arches having their keystone portions integral and substantially tangent, the inner and outer peripheral edges of the ring being V grooved, the cross section of the ring being substantially uniform throughout its length, the sides of the V grooves forming the opposed walls of the opposite arches, the ring being adapted to be compressed in the direction of the nut axis when the nut is tightened, tending to close the V grooves and flatten the arches, thus providing locking tension due to the tendency of the arches to recover their original shape when thus flattened.

EDWARD B. BEASLEY.